United States Patent
Fang

(10) Patent No.: US 9,390,164 B2
(45) Date of Patent: Jul. 12, 2016

(54) IDENTIFYING RELATIONSHIPS AMONG WORDS IN SEMANTIC WEB

(71) Applicant: Empire Technology Development LLC, Wilmington, DE (US)

(72) Inventor: Jun Fang, Shaanxi (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/408,753

(22) PCT Filed: Mar. 6, 2013

(86) PCT No.: PCT/CN2013/072234
§ 371 (c)(1),
(2) Date: Dec. 17, 2014

(87) PCT Pub. No.: WO2014/134796
PCT Pub. Date: Sep. 12, 2014

(65) Prior Publication Data
US 2015/0199425 A1    Jul. 16, 2015

(51) Int. Cl.
G06F 7/00 (2006.01)
G06F 17/30 (2006.01)
G06F 17/27 (2006.01)

(52) U.S. Cl.
CPC ...... *G06F 17/30684* (2013.01); *G06F 17/2785* (2013.01); *G06F 17/3053* (2013.01); *G06F 17/30864* (2013.01)

(58) Field of Classification Search
CPC .................................................. G06F 17/3053
See application file for complete search history.

(56) References Cited

U.S. PATENT DOCUMENTS

| | | | |
|---|---|---|---|
| 2010/0036797 A1* | 2/2010 | Wong | G06F 17/3087 706/55 |
| 2011/0202526 A1 | 8/2011 | Lee et al. | |
| 2011/0231395 A1 | 9/2011 | Vadlamani et al. | |

FOREIGN PATENT DOCUMENTS

| | | | |
|---|---|---|---|
| CN | 101566988 A | 10/2009 | |
| CN | 101901247 A | 12/2010 | |

OTHER PUBLICATIONS

Anyanwu, K., et al., "SemRank: ranking complex relationship search results on the semantic web," WWW '05 Proceedings of the 14th international conference on World Wide Web, pp. 117-127, (May 10-14, 2005).

Bollegala, D., et al., "Measuring Semantic Similarity between Words Using Web Search Engines," WWW '07 Proceedings of the 16th international conference on World Wide Web, pp. 757-766, (2007).

Cimiano, P. et al.,"Towards the Self-Annotating Web," WWW '04 Proceedings of the 13th international conference on World Wide Web, pp. 462-471, (2004).

(Continued)

*Primary Examiner* — Ajith Jacob
(74) *Attorney, Agent, or Firm* — Brundidge & Stanger, P.C.

(57) ABSTRACT

In one example, a method includes receiving a query regarding a relationship among keywords, using one or more web search engines to identify highly ranked web pages related to the keywords and highly ranked ontologies related to the words, extracting semantics that are related to the keywords from the highly ranked web pages, combining the highly ranked ontologies and the extracted semantics to form an integrated ontology, identifying relationships that are related to the keywords from the integrated ontology, and ranking the relationships.

15 Claims, 4 Drawing Sheets

(56) References Cited

OTHER PUBLICATIONS

Freitag, D. and Kushmerick, N., "Boosted wrapper induction," Proceedings of the Seventeenth National Conference on Artificial Intelligence and Twelfth Conference on Innovative Applications of Artificial Intelligence, pp. 577-583, (2000).

International Search Report for International Application No. PCT/CN2013/072234, mailed on Dec. 12, 2013.

Lee, J., et al., "An Effective Semantic Search Technique using Ontology," WWW '09 Proceedings of the 18th international conference on World wide web, pp. 1057-1058, (Apr. 20-24, 2009).

Schutz, A., and Buitelaar, P., "RelExt: A Tool for Relation Extraction from Text in Ontology Extension," Proceedings of the 4th International Semantic Web Conference (ISWC), vol. 3729, pp. 593-606, (2005).

Shannon, V., "A 'more revolutionary' Web," accessed on http://web.archive.org/web/20120105064002/http://www.nytimes.com/2006/05/23/technology/23iht-web.html, published on May 23, 2006, pp. 3.

* cited by examiner

IDENTIFYING RELATIONSHIPS AMONG WORDS IN SEMANTIC WEB

CROSS-REFERENCE INFORMATION TO RELATED APPLICATIONS

This Application is the National Stage filing under 35 U.S.C. §371 of PCT Application Ser. No. PCT/CN2013/072234 filed on Mar. 6, 2013. The disclosure of the PCT Application is hereby incorporated herein by reference in its entirety.

BACKGROUND

Users frequently search the web for information. When users input keywords, current search engines return related web pages that contain these keywords.

SUMMARY

According to some embodiments, a method may include, in response to a query regarding a relationship among keywords, using one or more web search engines to identify highly ranked web pages related to the keywords and highly ranked ontologies related to the keywords. The method may also include extracting semantics that are related to the keywords from the highly ranked web pages and combining the highly ranked ontologies and the extracted semantics to form an integrated ontology. The method may further include identifying relationships that are related to the keywords from the integrated ontology and ranking the identified relationships.

According to other embodiments, a non-transitory, computer-readable storage medium is encoded with instructions executable by a processor. The processor may execute the instructions to, in response to a query that provides keywords, use one or more web search engines to identify highly ranked web pages related to the keywords and highly ranked ontologies related to the keywords. The processor may also execute the instructions to extract semantics that are related to the keywords from the highly ranked web pages and combine the highly ranked ontologies and the extracted semantics to form an integrated ontology. The processor may further execute the instructions to identify relationships that are related to the keywords from the integrated ontology and rank the identified relationships.

According to other embodiments, a method may include using a keyword web search engine to identify highly ranked web pages that are related to keywords in a query, and using a semantic web search engine to identify highly ranked ontologies that area related to the keywords in the query. The method may also include, from the highly ranked web pages, extracting formulas that are related to the keywords, combining the highly ranked ontologies and the extracted formulas to form an integrated ontology. The method may further include, from the integrated ontology, iteratively identifying relationships that are related to the keywords and ranking the identified relationship based on rankings of source data and numbers of iterations to identify the relationships, where the source data are the highly ranked web pages and the highly ranked ontologies.

According to other embodiments, a computing system may include nonvolatile memory storing non-transitory executable instructions and a processor to execute the non-transitory executable instructions. The processor may execute the instructions to, in response to a query regarding a relationship among keywords, use one or more web search engines to identify highly ranked web pages related to the keywords and highly ranked ontologies related to the keywords. The processor may also execute the instructions to extract semantics that are related to the keywords from the highly ranked web pages and combine the highly ranked ontologies and the extracted semantics to form an integrated ontology. The processor may further execute the instructions to identify relationships that are related to the keywords from the integrated ontology and rank the identified relationships.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are therefore not to be considered limiting of its scope, the disclosure will be described with additional specificity and detail through use of the accompanying drawings.

In the drawings.

DETAILED DESCRIPTION

Figure 1:
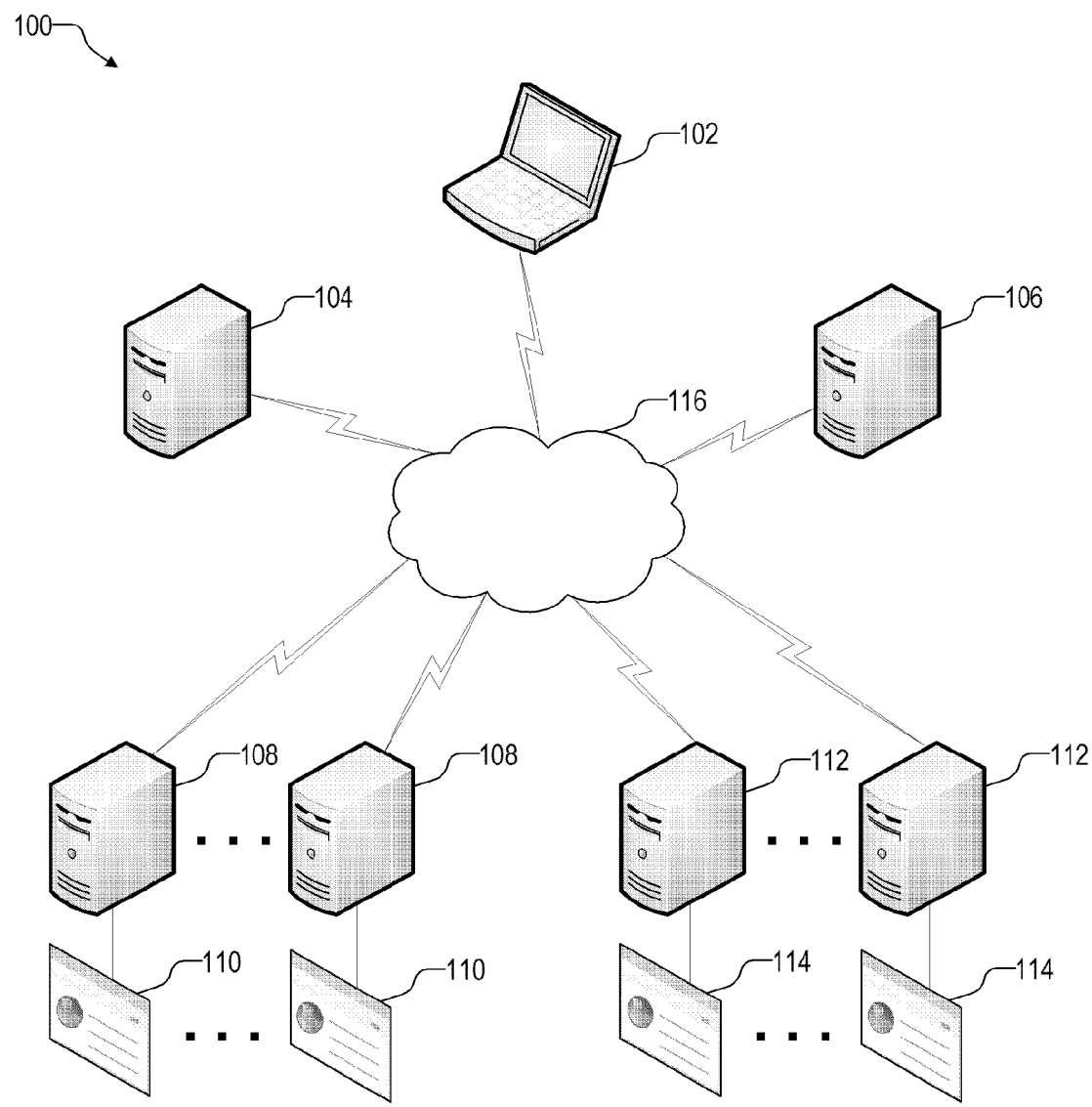
FIG. 1 is a block diagram of an illustrative system for implementing a method to identify relationships among keywords in accordance with various embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

When users search the web for information, they may be more interested in finding relationships among keywords rather than web pages that simply contain the keywords. For example, when users input keywords "London" and "sport," results like "London will hold the 2012 Olympic Games, which contain a lot of sport matches" or "football is a very popular sport in London, since there are many famous football clubs in it" may be more informative than web pages that contain the two keywords but have lesser context between the two words.

The present disclosure is generally drawn, inter alia, to technologies including methods, apparatus, systems, devices, and computer program products related to identifying relationships among keywords. In one example, a method uses one or more web search engines to find highly ranked ontologies and web pages related to the keywords, extracts semantics related to the keywords from the web pages, combines the ontologies and the extracted semantics to form an integrated ontology, identifies relationships among the keywords from the integrated ontology, and ranks the identified relationships.

In one example, the method uses an incremental reasoning method to calculate important relationships first. In one example, the method ranks the identified relationships based on the order of their data sources (the ontologies and the web pages) in the web search results and the number of steps taken by the incremental reasoning method to calculate relationships, as will be explained in further detail below.

FIG. 1 is a block diagram of an illustrative system 100 for implementing a method to identify relationships among keywords in one example of the present disclosure. System 100 includes a computing device 102, one or more web search engines, such as a keyword search engine 104 and a semantic search engine 106, servers 108 hosting respective web pages 110, and servers 112 hosting respective ontologies 114, and the Internet 116 and/or other network. Computing device 102, keyword search engine 104, semantic search engine 106, servers 108, and servers 112 communicate via the Internet 116. Computing device 102 receives an input of keywords and executes a method to identify relationships among the keywords. Computing device 102 may be a desktop computer, a laptop computer, a tablet computer, a smart phone, a smart television, a set-top box, or other type of device (including portable wireless devices) capable of network communications. Keyword search engine 104 may be Google, Bing, or another search engine that can run on one or more computing devices. Semantic search engine 106 may be Swoogle, Yummly, or another search engine that can run on one or more computing devices.

Figure 2:
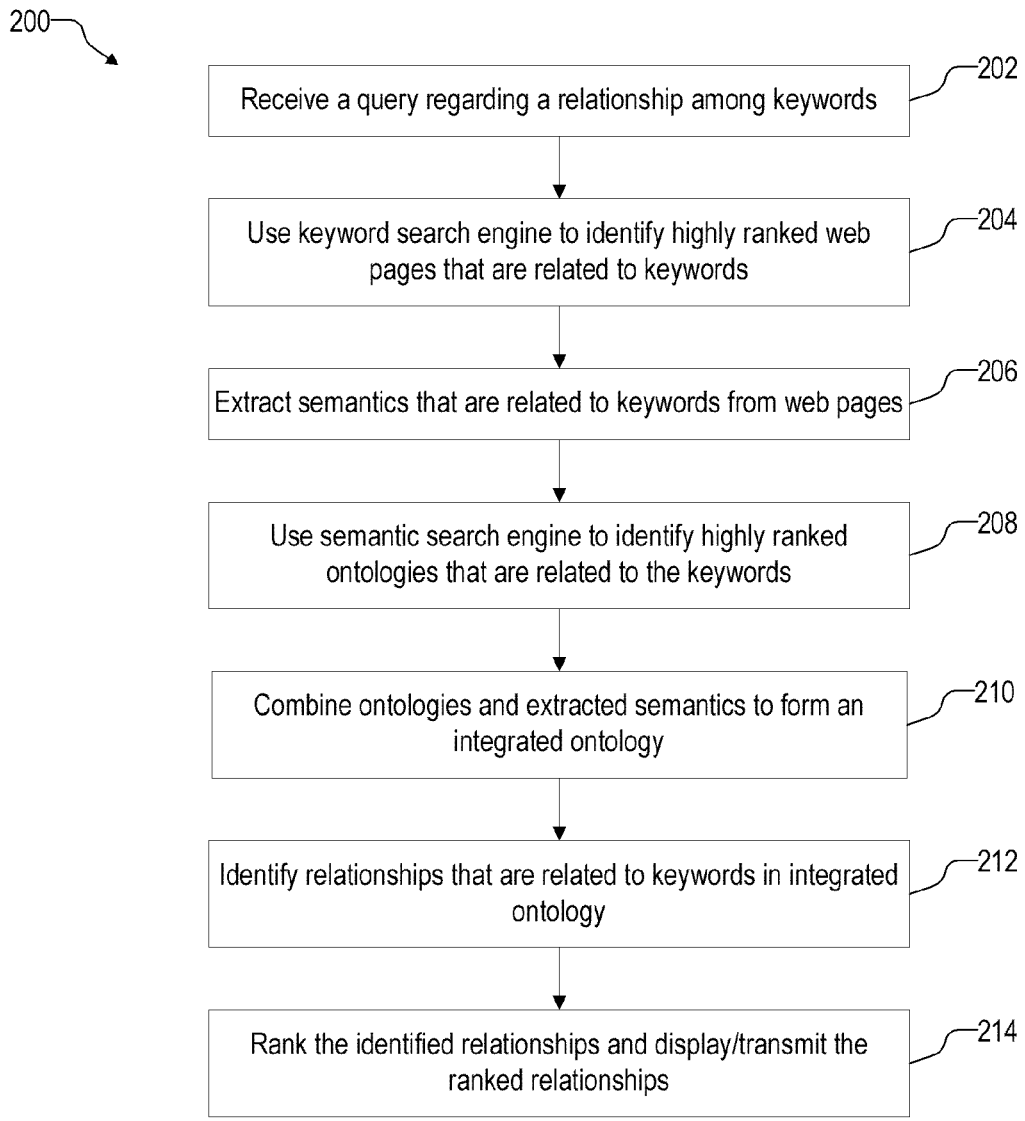
FIG. 2 is a flowchart of an illustrative method to identify relationships among keywords in accordance with various embodiments.

FIG. 2 is a flowchart of an illustrative method 200 for computing device 102 (FIG. 1) to identify relationships among keywords in one example of the present disclosure. Method 200 includes blocks 202, 204, 206, 208, 210, 212, and 214. Although the blocks in FIG. 2 and other figures in the present disclosure are illustrated in a sequential order, these blocks may also be performed in parallel, and/or in a different order than those described herein. Also, the various blocks may be combined into fewer blocks, divided into additional blocks, supplemented with additional blocks, and/or eliminated based upon the particular implementation.

Processing for method 200 may begin at block 202, "Receive a query regarding a relationship among keywords." Block 202 may be followed by block 204, "Use keyword search engine to identify highly ranked web pages that are related to keywords." Block 204 may be followed by block 206, "Extract semantics that are related to keywords from web pages." Block 206 may be followed by block 208, "Use semantic search engine to identify highly ranked ontologies that are related to the keywords." Block 208 may be followed by block 210, "Combine ontologies and extracted semantics to form an integrated ontology." Block 210 may be followed by block 212, "Identify relationships that are related to keywords in integrated ontology." Block 212 may be followed by block 214, "Rank the identified relationships and display/transmit the ranked relationships."

Method 200 may be implemented in any logic language. For convenience, first-order logic notations are used to explain method 200 since other logic languages, such as description logics, can be transformed into first-order logic. A formula denotes a semantic data, and a formula set or ontology is used to denote semantic data set.

In block 202, computing device 102 receives a query regarding a relationship among keywords. The query may be an input of keywords $W=\{w_1, \ldots\}$ that a user may enter into a query field of a search engine. A running example is used herein to explain method 200 with keywords "London" and "sport." Block 202 may be followed by block 204.

In block 204, computing device 102 uses keyword search engine 104 (FIG. 1) to identify highly ranked web pages that are related to keywords W. In one example, computing device 102 queries keyword search engine 104 to return a listing of web pages related to keywords W, such as web pages 110 (FIG. 1), and then selects the top m web pages from the listing. For example, a listing of M web pages (e.g., 50 web pages) is returned by keyword search engine 104, with the order of the M web pages in the listing being determined by a ranking method used by the search engine, and an m number of the highest ranked web pages (e.g., 5 web pages from the top down) in the listing may be referred to as the "top m" web pages. Computing device 102 assigns weights to the top m web pages received from keyword search engine 104, which may be used later to rank relationships. In one example, the top m web pages may be denoted as follows:

$$P=\{(p_1,pw_1), \ldots, (p_m,pw_m)\},$$

$$pw_i=1/\text{order of } p_i,$$

where P represents the top m web pages stored with their respective weights, $p_i$ is a web page, $pw_i$ is a weight of web page $p_i$, and order of $pw_i$ is the order of web page $p_i$ in the search result from keyword search engine 104. In one example, m may be 1, 2, 5, 10, 20, or 50.

In the running example, computing device 102 queries keyword search engine 104 with "London sport" to return related web pages and then selects the top web pages. Assume the top two web pages include a web page about sports in London from the Wikipedia web site, and a web page about the 2012 Summer Olympic Games from the International Olympics Committee web site (e.g., m=2; P={(Wikipedia, 1), (IOC, ½)} in this running example).

Block 204 may be followed by block 206.

In block 206, computing device 102 extracts semantics that are related to keywords W from web pages P. For each web page $p_i$, computing device 102 locates any keyword $w_i$ in the page, and then selects k neighboring sentences from this position as related sentences. In one example, k may be 1, 2, 5, 10, 20, 50, 75, or 100. Computing device 102 applies a semantics extraction method to extract formulas from the related sentences. Examples of a semantics extraction method may include pattern-based method, linguistic grammar-based method, machine learning-based method, or other method.

In the running example, the natural language sentences in web pages P may be at least partially expressed into formal knowledge representation formulas (e.g., first-order formulas). Note that all semantics of a sentence may not be transformed into a formula depending on the expressive ability of the knowledge representation language and so some semantics may be missing in the transformation. Hereafter, natural language sentences are still used for the ease of understanding the example.

After applying the above to web pages P, computing device 102 assigns weights to the extracted formulas, which may be later used to rank relationships. In one example, the extracted formulas may be denoted as follows:

$$EF=\{(ef_1,efw_1), \ldots\},$$

where EF represents the extracted formulas with their respective weights, $ef_i$ is an extracted formula, and $efw_i$ is the weight of extracted formula $ef_i$, which is equal to the weight of a web page from which the formula is extracted.

Block 206 may be followed by block 208.

In block 208, computing device 102 uses semantic search engine 106 (FIG. 1) to identify highly ranked ontologies (semantic data sets) that are related to keywords W. In one example, computing device 102 queries semantic search engine 106 to return ontologies that are related to keywords W, such as ontologies 114 (FIG. 1), and then selects the top n ontologies. For example, a listing of N ontologies (e.g., 50 ontologies) is returned by semantic search engine 106, with the order of the N web pages in the listing being determined by a ranking method used by the search engine, and an n number of the highest ranked ontologies (e.g., 5 ontologies from the top down) in the listing may be referred to as the "top n" ontologies. Computing device 102 assigns weights to the top n ontologies, which may be used later to rank relationships. In one example, the top n ontologies may be denoted as follows:

$$O=\{(o_1,ow_1),\ldots,(o_n,ow_n)\},$$

$$ow_i=1/\text{order of } o_i,$$

where O represents the top n ontologies stored with their respective weights, $o_i$ is an ontology, $ow_i$ is the weight of ontology $o_i$, and order of $o_i$ is the ranking order of ontology $o_i$ in the search result from semantic search engine 106. In one example, n may be 1, 2, 5, 10, 20, or 50.

In the running example, computing device 102 queries semantic search engine 106 with "London sport" to return related ontologies and then selects the top ontologies. Assume the top two ontologies include a geographical ontology and a sports ontology (e.g., n=2; P={(geographical ontology, 1), (sports ontology, ½)} in this running example). Assume the geographical ontology includes semantic information about London, such as "Wembley Stadium is located in London," "London is the capital of the United Kingdom," and a sport ontology with semantic information about various sports, such as "football is a sport," "swimming is a sport," "a sport is very popular in a city if it has many such sport clubs," and "a sport has many fans if it is popular."

Block 208 may be followed by block 210.

In block 210, computing device 102 combines ontologies O and extracted semantics (formulas EF) to form an integrated ontology IO. In one example, integrated ontology IO may be denoted as follows:

$$IO=o_1\cup\ldots\cup o_n\cup EF.$$

In one example, computing device 102 transforms the first-order logic formulas in integrated ontology IO to their conjunctive normal form (CNF) form by iteratively applying the following four rules until no more can be applied.

1) $\neg\exists xP(x)=\forall x\neg P(x)$
2) $\neg\forall xP(x)=\exists x\neg P(x)$
3) $\neg(P\wedge Q)=\neg P\vee\neg Q$
4) $\neg(P\vee Q)=\neg P\wedge\neg Q$ Block 210 may be followed by block 212.

In block 212, computing device 102 identifies relationships that are related to keywords W in integrated ontology IO. In one example, computing device 102 applies an incremental reasoning method on integrated ontology IO to calculate implicit (entailed) formulas that contain all the keywords W. Computing device 102 selects formulas relevant to keywords W based on the logical semantic distance between the formulas and a keyword, and uses the relevant formulas to calculate the implicit formulas. The logical semantic distance is based on resolvable relevance, which determines if a semantic relationship exists between two formulas and simulates the process of a resolution algorithm. With this distance measure, computing device 102 uses a selection function that selects the closest logically relevant formulas from integrated ontology IO step by step.

In logic reasoning, if an ontology O entails a formula $\alpha$, then $O\cup\{\neg\alpha\}$ is inconsistent. Using the resolution technique, all formulas that are resolvable with formula $\neg\alpha$ can conclude the inconsistency. Thus, only formulas resolvable with formula $\neg\alpha$ have an effect on the reasoning process, and the resolution reasoning process can be viewed as an incremental process based on the directly resolvable relevance.

Two CNF formulas $\alpha$ and $\beta$ are directly resolvably relevant if and only if (iff) there exists an atomic formula A such that A is in one of the two CNF formulas and $\neg A$ is in the other. The resolvent of formulas $\alpha$ and $\beta$ with respect of A is denoted as $res(\alpha,\beta)$.

Given a keyword w, a selection function $rf(w,k)$ based on resolvable relevance returns implicit formulas that are 0 to k-step relevant with keyword w.

$$rf(w,0)=\{\text{formulas that contain keyword } w \text{ in integrated ontology IO}\};$$

$$rf(w,k)=\{res(\omega,\phi)|\omega \text{ and } \phi \text{ are directly resolvable where } \phi \in rf(w,k-1)\}$$

where $k\geq 0$.

Figure 3:
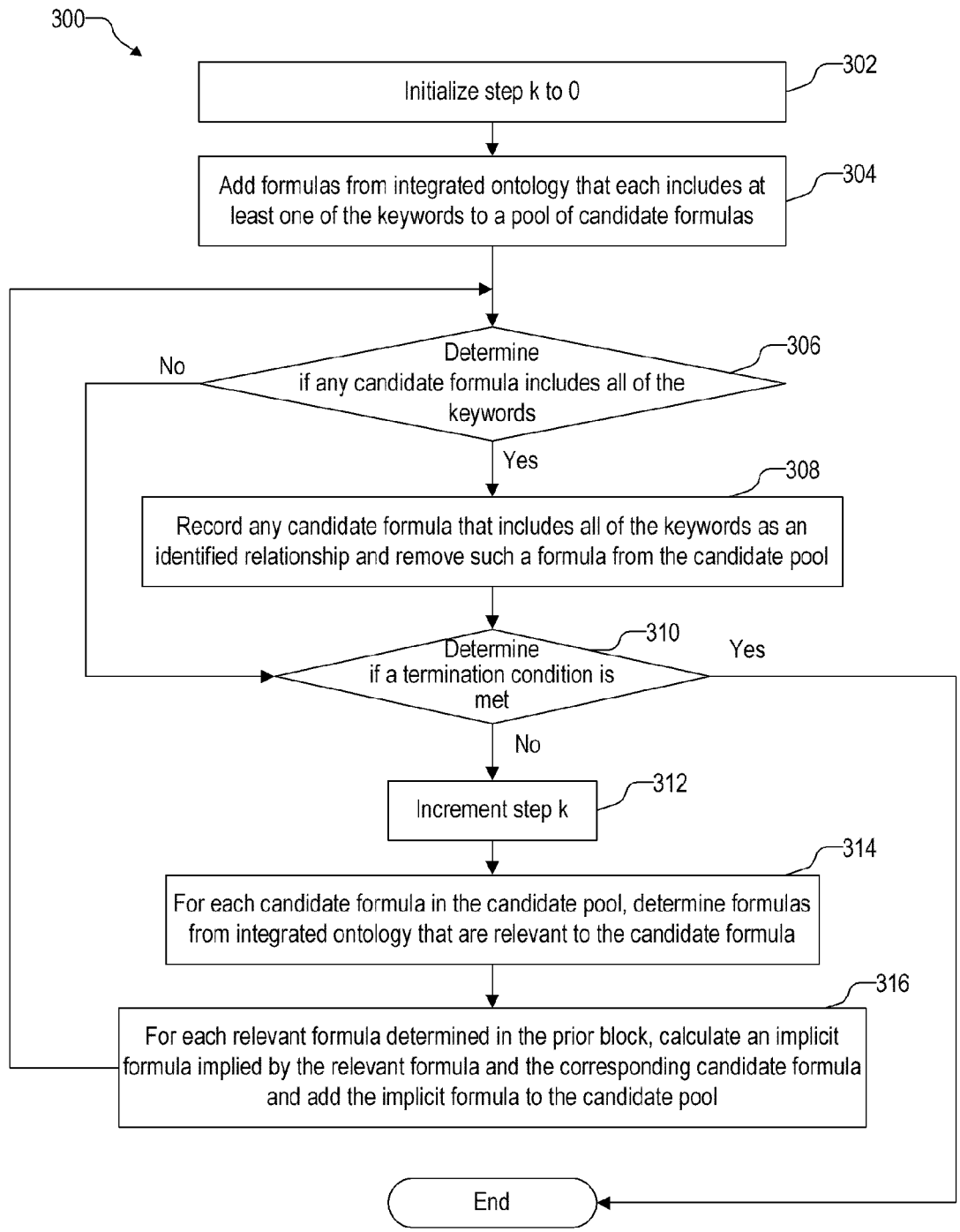
FIG. 3 is a flowchart of an incremental reasoning method to compute entailed formulas that contain keywords in accordance with various embodiments.

FIG. 3 is a flowchart of the incremental reasoning method 300, which may be used at the block 212 in FIG. 2, for implementing a selection function to calculate the closest logically relevant formulas step by step in one example of the present disclosure. Method 300 includes blocks 302, 304, 306, 308, 310, 312, 314, and 316.

Processing for method 300 may begin at block 302, "Initialize step k to 0." Block 302 may be followed by block 304, "Add formulas from integrated ontology that each includes at least one of the keywords to a pool of candidate formulas." Block 304 may be followed by decision block 306, "Determine if any candidate formula includes all of the keywords." When there is no candidate formula including all of the keywords, decision block 306 may be followed by block 310. Otherwise decision block 306 may be followed by block 308, "Record any candidate formula that includes all of the keywords as an identified relationship and remove such a formula from the candidate pool." Block 308 may be followed by decision block 310, "Determine if a termination condition is met." When a termination condition is met, method 300 ends. Otherwise decision block 310 may be followed by block 312, "Increment step k." Block 312 may be followed by block 314, "For each candidate formula in the candidate pool, determine formulas from integrated ontology that are relevant to the candidate formula." Block 314 may be followed by block 316, "For each relevant formula determined in the prior block, calculate an implicit formula implied by the relevant formula and the corresponding candidate formula and add the implicit formula to the candidate pool." Block 316 may loop back to block 306.

In block 302, computing device 102 initializes a step k to 0. Block 302 may be followed by block 304.

In block 304, computing device 102 selects formulas from integrated ontology IO that each includes at least one of the keywords W and adds them to a pool of candidate formulas.

In the running example, formulas such as "Wembley Stadium is located in London," "London has several of England's leading football clubs," "London has hosted major international tournaments and has professional teams in many sports," etc. are added to the candidate pool.

Block 304 may be followed by block 306.

In block 306, computing device 102 determines if any candidate formula includes all of the keywords W. If so, block 306 may be followed by block 308. Otherwise block 306 may be followed by block 310.

In block 308, computing device 102 records any candidate formula that includes all of the keywords W as an identified relationship and removes such a formula from the candidate pool. Each identified relationship is denoted as (rf, rw, E), where rf is the candidate formula, rw is the weight of the reasoning process, and E is the explanation of candidate formula rf. Weight rw is the reciprocal of the number of steps (k+1) in which implicit formula rf is calculated. Explanation E includes the minimal formula set $E=\{(e_1,ew_1),\ldots\}$ to entail (imply) implicit formula rf, where $e_i$ is a formula and $ew_i$ is the weight of formula $e_i$. Note that in the first step when k=0, the relationship is an original candidate formula that does not have any explanation so E is set as the weight of the source of the candidate formula (e.g., pw or ow).

In the running example, in the first step, computing device 102 records "London has hosted major international tournaments and has professional teams in many sports" as an identified relationship and removes it from the candidate pool. A second iteration is described later after explaining subsequent blocks.

Block 308 may be followed by block 310.

In block 310, computing device 102 determines if a termination condition is met. The termination condition may be a maximum run time of method 300, a maximum step number, a maximum number of identified relationships, or other condition. If the termination condition has been met, method 300 ends. Otherwise block 310 may be followed by block 312 to continue the iterative process.

In block 312, computing device 102 increments step k. Block 312 may be followed by block 314.

In block 314, for each candidate formula in the candidate pool, computing device 102 determines formulas from integrated ontology IO that are relevant to the candidate formula. In one example, a formula from integrated ontology IO is relevant to a candidate formula when they are directly resolvably relevant. Block 314 may be followed by block 316.

In block 316, for each relevant formula determined in block 314, computing device 102 calculates an implicit formula entailed (implied) by the relevant formula and the corresponding candidate formula and add the implicit formula to the candidate pool. The implicit formula is a resolvent of the relevant formula and the selected formula.

Block 316 may loop back to block 306.

In the running example, in the second step when k=1, computing device 102 may obtain "Sun Yang sets a world record time in a sport match in London" from "Sun Yang sets a world record time in men's 1500 freestyle swimming in the 2012 Summer Olympics," "swimming is a sport," and "The 2012 Summer Olympics took place in London" based on relations "in the same place" and "is a." Note the latter three formulas are the explanation of the first one. Computing device 102 may also obtain "Football is a very popular sport in London" from "A sport is very popular in a city if it has many such sport clubs," "London has more than ten football clubs." Note the latter two formulas are the explanation of the first one.

In the running example, in the third step when k=2, "There are many football fans in London" follows from "Football is a very popular sport in London," "London has more than ten football clubs," and "A sport has many fans if it is popular." Note the latter three formulas are the explanation of the first one.

Referring back to FIG. 2, block 212 may be followed by block 214.

In block 214, computing device 102 ranks the identified relationships and displays or transmits the ranked relationships. In one example, each ranked relationship is accompanied by its explanation.

In one example, the identified relationships are ranked according to the order of their data sources and the step information of the incremental reasoning method. This is because if an explanation for a relationship has greater weight, the relationship also has greater weight since the explanation is the source of the entailed relationship. If the relationship is calculated in fewer steps of the incremental reasoning method, then it has greater weight because fewer steps mean a closer logic distance (semantic relation) between the entailed relationship and the keywords.

For a record (rf, rw, E), the final weight may be calculated using the following equation:

$$fw = \tau \times rw + (1-\tau) \times \frac{\Sigma ew_i}{|E|},$$

where rw represents the weight of step information, $$\frac{\Sigma ew_i}{|E|}$$

represents the average weight of explanation information.

In the running example, the result "Sun Yang set a world record time in a sport match in London," the logic distance (the reciprocal of the step) is 0.5 since it is calculated in the second step. The explanation weight is the average weights of the three formulas "Sun Yang set a world record time in men's 1500 freestyle swimming in the 2012 Summer Olympics," "swimming is a sport," and "The 2012 Summer Olympics took place in London." The final weight is then a combination of the logical distance and the explanation weights.

For the result "There are many football fans in London," the logical distance is $0.\overline{3}$ since it calculated in the third step. The explanation weight is the average of weight of three formulas "A sport is very popular in a city if it has many such sport clubs," "London has more than ten football clubs," and "A sport has many fans if it is popular." The final weight is then a combination of the logical distance and the explanation weights.

Figure 4:
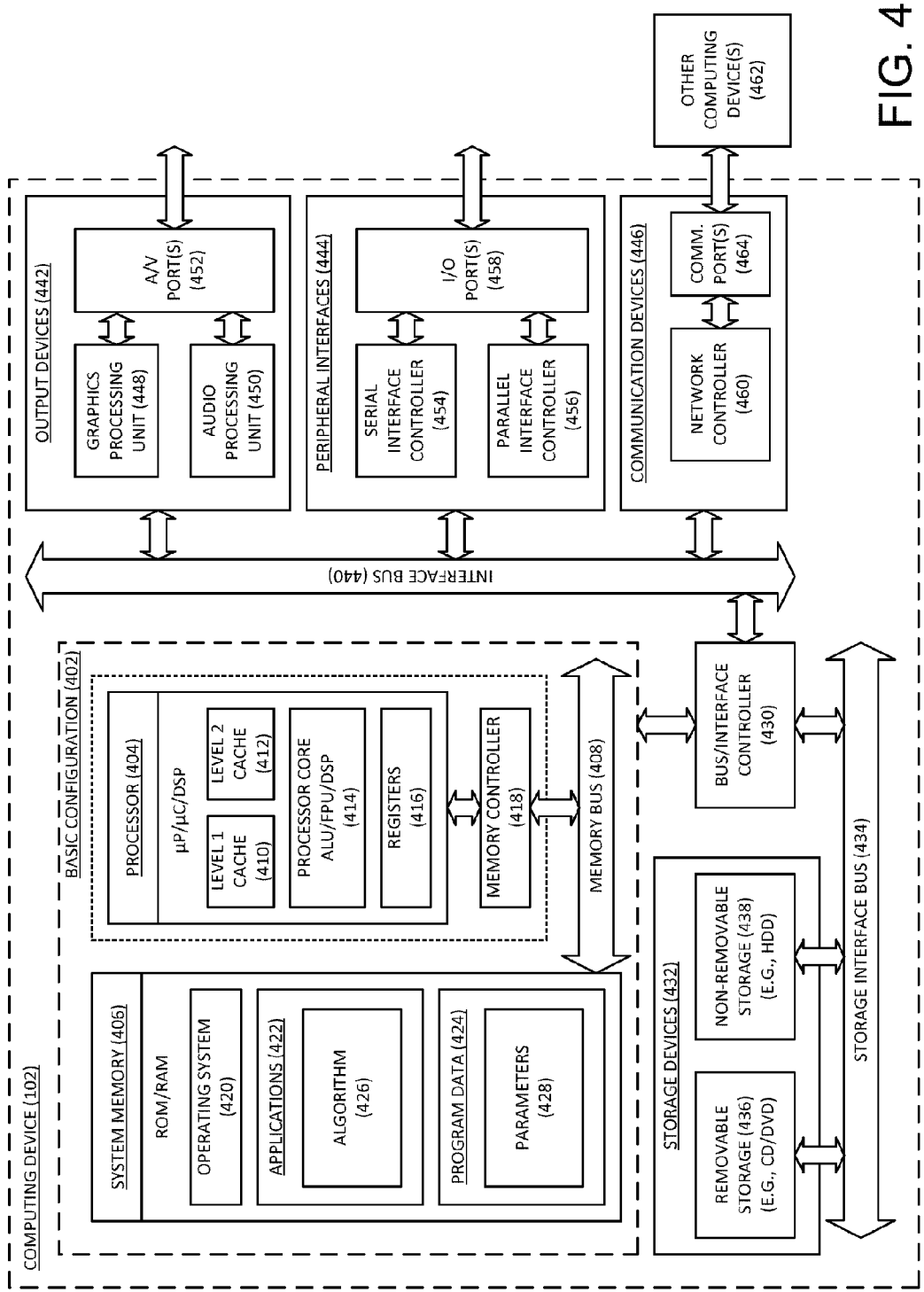
FIG. 4 is a block diagram of an illustrative computing device of FIG. 1 configured to identify relationships among keywords in accordance with various embodiments, all arranged with at least some examples of the present disclosure.

FIG. 4 is a block diagram of an example computing device 102 configured to identify relationship among keywords, arranged in accordance with at least some examples of the present disclosure. In a basic configuration, computing device 102 typically includes one or more host processors 404 and a system memory 406. A memory bus 408 may be used for communicating between host processor 404 and system memory 406.

Depending on the particular configuration, host processor 404 may be of any type including but not limited to a microprocessor (µP), a microcontroller (µC), a digital signal processor (DSP), or any combination thereof. Host processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with host processor 404, or in some implementations memory controller 418 may be an internal part of host processor 404.

Depending on the particular configuration, system memory 406 may be of any type including but not limited to volatile memory (such as RAM), non-volatile memory (such as ROM, flash memory, etc.), or any combination thereof. System memory 406 may include an operating system 420, one or more applications 422, and program data 424. Application 422 may include an algorithm 426 that can be arranged to perform the functions as described herein including those described with respect to at least method 200 in FIG. 2 and method 300 in FIG. 3. Program data 424 may include parameters 428 associated with algorithm 426. In some embodiments, application 422 may be arranged to operate with program data 424 on operating system 420 such a method to identify relationships among keywords may be performed as described herein. This described basic configuration 402 is illustrated in FIG. 4 by those components within the inner dashed line.

Computing device 102 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile (non-transitory), removable and non-removable media implemented in any method or technology for storage of information, such as computer readable instructions, data structures, program modules, or other data.

System memory 406, removable storage devices 436, and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 102. Any such computer storage media may be part of computing device 102.

Computing device 102 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464. In some implementations, computing device 102 includes a multi-core processor, which may communicate with the host processor 404 through the interface bus 440.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 102 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 102 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the particular vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware is possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link and/or channel, a wireless communication link and/or channel, etc.).

The devices and/or processes are described in the manner set forth herein, and thereafter engineering practices may be used to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The subject matter described herein sometimes illustrates different components contained within, or connected with, different other components. Such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, the terms may be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense generally understood for the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense generally understood for the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments are possible. The various aspects and embodiments disclosed herein are for purposes of illustration and are not intended to be limiting, with the true scope and spirit being indicated by the following claims.

I claim:

1. A method, comprising:
    in response to a query regarding a relationship among keywords, using one or more web search engines to identify highly ranked web pages related to the keywords and highly ranked ontologies related to the keywords;
    extracting semantics that are related to the keywords from the highly ranked web pages;
    combining the highly ranked ontologies and the extracted semantics to form an integrated ontology;
    identifying relationships that are related to the keywords from the integrated ontology, the identifying relationships comprising:

from the integrated ontology, adding one or more formulas that each includes at least one of the keywords as candidate formulas to a candidate pool, and performing an iterative process, comprising:
recording any candidate formula that includes all of the keywords as one of the relationships and removing the recorded candidate formula from the candidate pool,
for each candidate formula in the candidate pool, determining one or more formulas from the integrated ontology that are relevant to the candidate formula,
for each relevant formula, determining an implicit formula implied from the relevant formula and a corresponding candidate formula, and
repeating the iterative process; and
ranking the identified relationships.

2. The method of claim 1, wherein the determining one or more formulas from the integrated ontology that are relevant to the candidate formula includes determining whether two formulas are directly resolvably relevant.

3. The method of claim 2, wherein the determining an implicit formula implied from the relevant formula and a corresponding candidate formula comprises determining a resolvent of the relevant formula and the corresponding candidate formula.

4. The method of claim 1, further comprising terminating the iterative process in response to meeting a terminal condition, the terminal condition being at least one of a run time, a number of iterations, and a number of the relationships recorded.

5. The method of claim 1, wherein the ranking the identified relationships comprises:
determining a weight of any formula extracted from a highly ranked web page or originally located in a highly ranked ontology based on an order of the highly ranked web page or the highly ranked ontology provided by the one or more web search engines;
determining a weight of any implicit formula that is implied from two or more formulas based on weights of the two or more formulas and a number of iterations that generated the implicit formula; and
ranking the relationships by weight.

6. The method of claim 1, further comprising displaying or transmitting the ranked relationships where any formula that is implied from two or more formulas comprises the two or more formulas as explanations for the formula.

7. The method of claim 1, wherein the using one or more web search engines comprises using a keyword search engine to search for the highly ranked web pages and using a semantic search engine to search for the highly ranked ontologies.

8. The method of claim 1, wherein the extracting semantics comprises:
selecting neighboring sentences about any keywords from the highly ranked web pages; and
applying semantic extraction to the neighboring sentences.

9. The method of claim 8, wherein the applying semantic extraction to the neighboring sentences comprises applying a pattern based semantic extraction, a linguistic grammar-based semantic extraction, or a machine learning-based semantic extraction.

10. A non-transitory, computer-readable storage medium encoded with instructions executable by a processor to:
in response to a query that provides keywords, use one or more web search engines to identify highly ranked web pages related to the keywords and highly ranked ontologies related to the keywords;
extract semantics that are related to the keywords from the highly ranked web pages;
combine the highly ranked ontologies and the extracted semantics to form an integrated ontology;
identify relationships that are related to the keywords from the integrated ontology, the identify relationships comprising:
from the integrated ontology, add one or more formulas that each includes at least one of the keywords as candidate formulas to a candidate pool, and
perform an iterative process, comprising:
record any candidate formula that includes all of the keywords as one of the relationships and remove the recorded candidate formula from the candidate pool,
for each candidate formula in the candidate pool, determine one or more formulas from the integrated ontology that are relevant to the candidate formula,
for each relevant formula, determine an implicit formula implied from the relevant formula and a corresponding candidate formula, and
repeat the iterative process; and
rank the identified relationships.

11. The non-transitory, computer-readable storage medium of claim 10, wherein the instructions to rank the identified relationships include instructions executable by the processor to:
determine a weight of any formula extracted from a highly ranked web page or originally located in a highly ranked ontology based on an order of the highly ranked web page or the highly ranked ontology provided by the one or more web search engines;
determine a weight of any implicit formula that is implied from two or more formulas based on weights of the two or more formulas and a number of iterations that generated the implicit formula; and
rank the identified relationships by weight.

12. The non-transitory, computer-readable storage medium of claim 10, wherein the instructions further include instructions executable by the processor to display or transmit the ranked relationships where any formula that is implied from two or more formulas comprises the two or more formulas as explanations for the formula.

13. A computing system, comprising:
nonvolatile memory storing non-transitory executable instructions; and
a processor to execute the non-transitory executable instructions to:
in response to a query regarding a relationship among keywords, use one or more web search engines to identify highly ranked web pages related to the keywords and highly ranked ontologies related to the keywords;
extract semantics that are related to the keywords from the highly ranked web pages;
combine the highly ranked ontologies and the extracted semantics to form an integrated ontology;
identify relationships that are related to the keywords from the integrated ontology, the identify relationships comprising:
from the integrated ontology, add one or more formulas that each includes at least one of the keywords as candidate formulas to a candidate pool, and perform an iterative process, comprising:
  record any candidate formula that includes all of the keywords as one of the relationships and remove the recorded candidate formula from the candidate pool,
  for each candidate formula in the candidate pool, determine one or more formulas from the integrated ontology that are relevant to the candidate formula,
  for each relevant formula, determine an implicit formula implied from the relevant formula and a corresponding candidate formula, and
  repeat the iterative process; and
  rank the identified relationships.

14. The computing system of claim 13, wherein the instructions to rank the identified relationships include instructions executable by the processor to:
  determine a weight of any formula extracted from a highly ranked web page or originally located in a highly ranked ontology based on an order of the highly ranked web page or the highly ranked ontology provided by the one or more web search engines;
  determine a weight of any implicit formula that is implied from two or more formulas based on weights of the two or more formulas and a number of iterations that generated the implicit formula; and
  rank the relationships by weight.

15. The method of claim 1, wherein the identifying relationships that are related to the keywords from the integrated ontology comprises identifying, iteratively, relationships that are related to the keywords from the integrated ontology, and wherein the ranking the identified relationships is based on rankings of source data and numbers of iterations to identify the relationships, the source data being the highly ranked web pages and the highly ranked ontologies.

* * * * *